(12) United States Patent
Lee et al.

(10) Patent No.: US 10,018,219 B2
(45) Date of Patent: Jul. 10, 2018

(54) HOLLOW DRIVE SHAFT AND METHOD FOR MANUFACTURING SAME

(71) Applicant: erae AMS Co., Ltd., Daegu (KR)

(72) Inventors: Hyun-Il Lee, Daegu (KR); Jung-Su Noh, Daegu (KR); Jang-Sun Lee, Daegu (KR); Jong-Uk Seo, Daegu (KR); Jae-Seung Jeong, Daegu (KR); Myung-Gil Chun, Daegu (KR); Ki-Hoon Kim, Daegu (KR); Dong-Hyun Song, Daegu (KR)

(73) Assignee: ERAE AMS CO., LTD., Daegu (KR)

( * ) Notice: Subject to any disclaimer, the term of this patent is extended or adjusted under 35 U.S.C. 154(b) by 120 days.

(21) Appl. No.: 15/021,205

(22) PCT Filed: Sep. 5, 2014

(86) PCT No.: PCT/KR2014/008427
§ 371 (c)(1),
(2) Date: Mar. 10, 2016

(87) PCT Pub. No.: WO2015/037897
PCT Pub. Date: Mar. 19, 2015

(65) Prior Publication Data
US 2016/0223011 A1 Aug. 4, 2016

(30) Foreign Application Priority Data
Sep. 11, 2013 (KR) .................. 10-2013-0109010

(51) Int. Cl.
*F16C 3/02* (2006.01)
*B60K 17/22* (2006.01)
(Continued)

(52) U.S. Cl.
CPC ............... *F16C 3/02* (2013.01); *B21K 1/063* (2013.01); *B60K 17/22* (2013.01); *C23C 8/22* (2013.01)

(58) Field of Classification Search
CPC .. B60K 17/22; C23C 8/22; F16C 3/02; B21K 1/063
(Continued)

(56) References Cited

U.S. PATENT DOCUMENTS 8,101,031 B2 * 1/2012 Sakurai ................ B21J 5/12
464/183 X
2012/0211125 A1 8/2012 Yoshida et al.

FOREIGN PATENT DOCUMENTS

CN 1989351 A 6/2007
CN 102597547 A 7/2012
(Continued)

*Primary Examiner* — Greg Binda
(74) *Attorney, Agent, or Firm* — Novick, Kim & Lee PLLC; Jae Youn Kim

(57) ABSTRACT

Provided are a hollow drive shaft and a method for manufacturing the same in which a concentrated load to a weak point which may be occurred by differences of sectional thicknesses and outer diameters of the shaft is dispersed so that the strength may be uniform throughout the whole length of the drive shaft. The hollow drive shaft includes: one or more small-diameter portion having a hollow shape; and a large-diameter portion which is disposed in a vicinity of the small-diameter portion and has an outer diameter relatively greater than the small-diameter portion. A sectional thickness of the large-diameter portion is less than a sectional thickness of the small-diameter portion, and a first sectional portion from an outer surface to a point corresponding to 35% to 60% of a sectional thickness of the large-diameter portion is carburized to have a first hardness.

13 Claims, 3 Drawing Sheets

(51) Int. Cl.
    *C23C 8/22*     (2006.01)
    *B21K 1/06*     (2006.01)

(58) Field of Classification Search
    USPC .................................. 464/183; 148/210, 223
    See application file for complete search history.

(56) References Cited

FOREIGN PATENT DOCUMENTS

| | | |
|---|---|---|
| EP | 1798427 A1 | 6/2007 |
| JP | 05-004128 A | 1/1993 |
| JP | 2000-336469 A | 5/2000 |
| JP | 2001-063307 A | 3/2001 |
| JP | 2006002185 A | 1/2006 |
| JP | 2006002809 A | 1/2006 |
| JP | 2006-26697 A | 2/2006 |
| JP | 2006-045605 A | 2/2006 |
| JP | 2013-066903 A | 4/2013 |
| KR | 10-2000-0037732 A | 7/2000 |
| KR | 10-2007-0107140 A | 11/2007 |
| WO | 2006-025369 A1 | 3/2006 |

\* cited by examiner

HOLLOW DRIVE SHAFT AND METHOD FOR MANUFACTURING SAME

TECHNICAL FIELD

The present invention relates to a hollow drive shaft which is used to vehicles or the like.

BACKGROUND ART

Generally, a drive shaft is one of power transmitting mediums for transmitting rotation force of a driving source to a driven member, and may be divided into a solid drive shaft and a hollow drive shaft.

The hollow drive shaft has smaller weight than the solid drive shaft so as to achieve light weight and also has good characteristics from the point of view of torsional strength.

As a conventional art, a hollow drive shaft formed by a high-frequency quenching method which is disclosed in Korean Patent Publication No. 10-2007-0107140 has technical features that contents of Ti, N and B which have effects on quenching quality are regulated and the quenching is performed through a whole thickness in order to obtain a desired strength.

However, since the quenching is performed through the whole thickness in the prior art, the strength may be increased in case of a hollow drive shaft which has a uniform sectional thickness in a whole length direction and a uniform outer circumferential diameter, but there may be a weak portion due to the differences of a sectional thickness and an outer circumferential diameter in case of a drive shaft which has a non-uniform section thickness in a whole length direction and a non-uniformed outer circumferential diameter so that the fatigue load due to a distortion may be focused on the weak portion so as to have a problem of weak strength although the quenching is performed.

DETAILED DESCRIPTION OF THE INVENTION

Technical Problem

The present invention has been made in an effort to provide a hollow drive shaft and a method for manufacturing the same in which the concentrated load to a weak point which may be occurred by differences of sectional thicknesses and outer diameters is dispersed so that the strength may be uniform throughout the whole length.

Technical Solution

A hollow drive shaft according to an exemplary embodiment of the present invention includes: one or more small-diameter portion having a hollow shape; and a large-diameter portion which is disposed in the vicinity of the small-diameter portion and has an outer diameter relatively greater than the small-diameter portion. A sectional thickness of the large-diameter portion is less than a sectional thickness of the small-diameter portion, and a first sectional portion from an outer surface to a point corresponding to 35% to 60% of a sectional thickness of the large-diameter portion is carburized to have a first hardness.

A second sectional portion of the large-diameter portion except the first sectional portion may be carburized to have a hardness of HRC 40.

A transition portion having a hardness of between HRC 40 to HRC 55 may be formed between the first sectional portion and the second sectional portion.

The small-diameter portion may be carburized to be hardened under a heat treatment condition in which the first sectional portion is hardened more than HRC 55 and at the same time the second sectional portion is hardened HRC 40.

The large-diameter portion may be heat-treated by a vacuum carburization.

A surface of the large-diameter portion may be homogenized by a shot blast.

The one of more small-diameter portion may include a first small-diameter portion and a second small-diameter portion and the large-diameter portion may be disposed between the first small-diameter portion and the second small-diameter portion.

The small-diameter portion and the large-diameter portion may be formed by a swaging.

A connecting portion of a hollow shape may be formed between the small-diameter portion and the large-diameter portion by the swaging.

The connecting portion may be rounded with a radius more than 30% of an outer diameter of the small-diameter portion.

A method for manufacturing a hollow drive shaft according to an exemplary embodiment of the present invention includes: forming one or more small-diameter portion having a hollow shape and a large-diameter portion which is disposed in the vicinity of the small-diameter portion and has an outer diameter relatively greater than the small-diameter portion, a sectional thickness of the large-diameter portion being less than a sectional thickness of the small-diameter portion; and carburizing the small-diameter portion and the large-diameter portion. The carburizing is performed under a heat treatment condition in which a first sectional portion from an outer surface to a point corresponding to 35% to 60% of a sectional thickness of the large-diameter portion is carburized to have a hardness of more than HRC 55.

In the heat treatment condition, a second sectional portion of the large-diameter portion except the first sectional portion may be carburized to have a hardness of HRC 40.

In the heat treatment condition, a transition portion having a hardness of between HRC 40 to HRC 55 may be formed between the first sectional portion and the second sectional portion.

The large-diameter portion may be heat-treated by a vacuum carburization.

A surface of the large-diameter portion may be homogenized by a shot blast.

In the forming, the small-diameter portion and the large-diameter portion may be formed by a swaging.

A connecting portion of a hollow shape may be formed between the small-diameter portion and the large-diameter portion by the swaging, and the connecting portion may be rounded with a radius more than 30% of an outer diameter of the small-diameter portion.

A hollow drive shaft according to another exemplary embodiment of the present invention includes: one or more small-diameter portion having a hollow shape; and a large-diameter portion which is disposed in the vicinity of the small-diameter portion and has an outer diameter relatively greater than the small-diameter portion. A sectional thickness of the large-diameter portion is less than a sectional thickness of the small-diameter portion, and a first sectional portion from an outer surface to a point corresponding to 35% to 60% of a sectional thickness of the large-diameter portion is carburized to have a first hardness. A second sectional portion of the large-diameter portion except the first sectional portion is carburized to have a second hardness, and the first hardness is greater than the second hardness.

Advantages Effects

The hollow drive shaft according to an embodiment of the present invention and a manufacturing thereof have the following advantages.

According to an embodiment of the present invention, since the whole portion of the hollow drive shaft 100 having different sectional thicknesses and outer diameters are carburized to be hardened and the first sectional portion 121 from an outer surface to a point corresponding to 35% to 60% of the sectional thickness of the large-diameter portion 120 is carburized to have the hardness of more than HRC 55, the strength along the whole length may be uniformed so that it can be minimized that the hollow drive shaft 100 is broken at its weak point. In particular, in case that the hardness of the first section portion 121 is greater than the hardness of the second sectional portion 122, the strength along the whole length may be maximally uniformed so that it can be minimized that the hollow drive shaft 100 is broken at its weak point.

BRIEF DESCRIPTIONS OF DRAWINGS

BEST MODE

Hereinafter, embodiments of the present invention will be described in detail with reference to the accompanying drawings such that a person with ordinary skill in the art can easily performed this invention. However, the present invention can be realized in various different ways and is not limited to the described embodiments.

Figure 1:
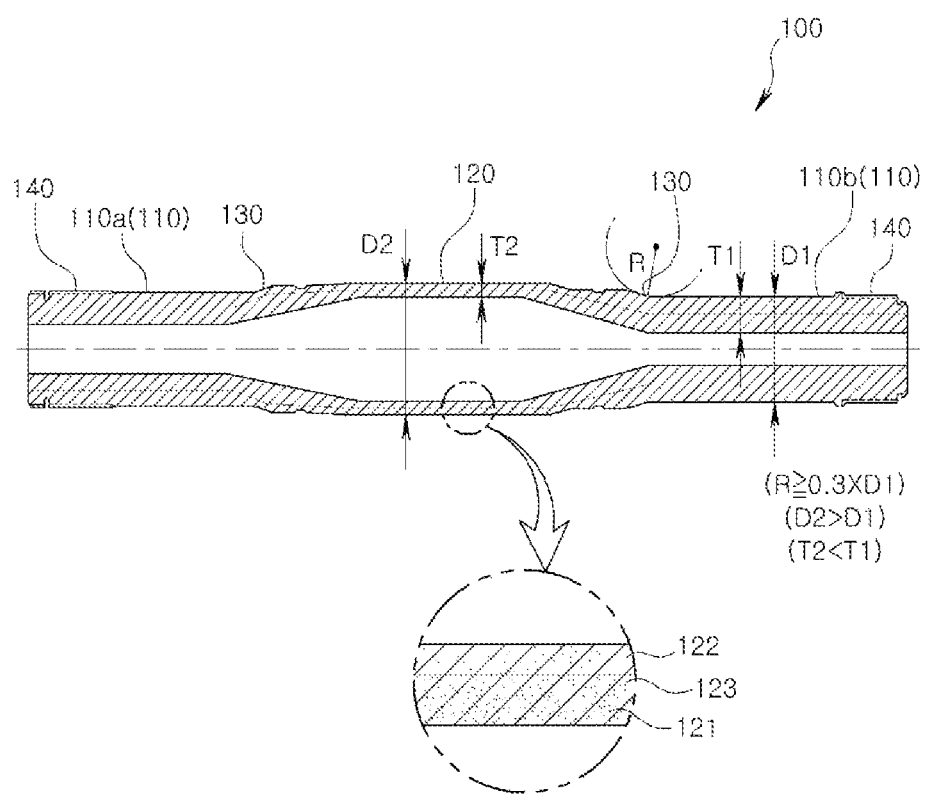
FIG. 1 is a schematic sectional view of a hollow drive shaft according to an embodiment of the present invention.
Figure 2:
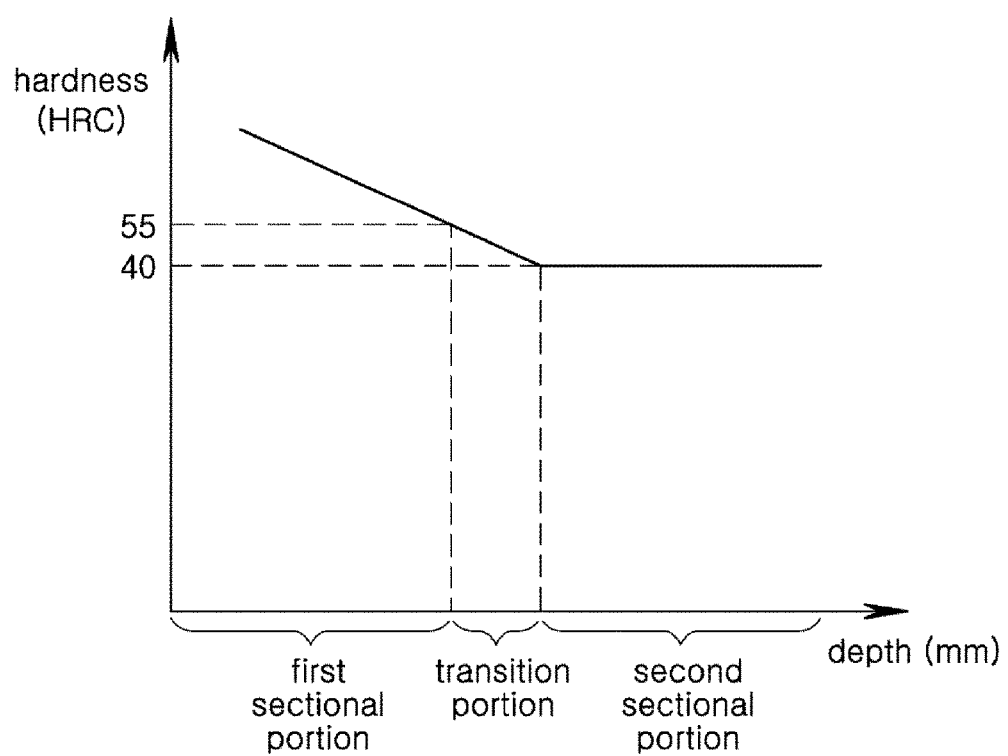
FIG. 2 is a graph showing hardness of sectional portions of a large-diameter portion of a hollow drive shaft according to an embodiment of the present invention.

FIG. 1 is a schematic sectional view of a hollow drive shaft according to an embodiment of the present invention, and FIG. 2 is a graph showing hardness of sectional portions of a large-diameter portion of a hollow drive shaft according to an embodiment of the present invention.

A hollow drive shaft 100 according to an embodiment of the present, as shown in FIG. 1, includes one or more small-diameter portion 110 and large-diameter portion 120.

The one or more small-diameter portion 110 has a hollow shape. For example, as shown in FIG. 1, the one or more small-diameter portion 110 may include a first small-diameter portion 110a and a second small-diameter portion 110b which are respectively extended from one end and the other end of the large-diameter portion 120. In particular, although the sectional thicknesses and the outer diameters of the small-diameter portion 110 may be changed depending on the specification required by a car maker, the outer circumferential radius thereof is formed to be smaller than that of the large-diameter portion 120.

Further, the small-diameter portion 110 may be formed by a rotary swaging or a linear extrusion, and in particular in case of the rotary swaging, a mandrel (not shown) is inserted into a hollow portion of the small-diameter portion 110 so that the burr due to a deformation can be prevented. In addition, a spline 140 for connecting a counter port (not shown) may be formed at an end portion of the small-diameter portion 110, and in particular a mandrel is inserted into the hollow portion of the small-diameter portion 110 while the spline 140 is being formed so as to minimize the deformation of the spline 140 in a circumferential direction.

The large-diameter portion 120 has a hollow shape, and may be provided to be located in the vicinity of the small-diameter portion 110 and is formed to have a larger diameter than the small-diameter portion 110. Further, as shown in FIG. 1, the large-diameter portion 120 may be interposed between the first small-diameter portion 110a and the second small-diameter portion 110b. In particular, since the large-diameter 120 is formed in a single thickness and a single outer circumferential diameter different from the small-diameter portion 110 for the prevention of coupling and interference with neighboring part (not shown), it is used as a criteria for change in hardness along a depth due to the caburizing in a caburization heat treatment process.

Further, the large-diameter portion 120 may be formed by a rotary swaging or a linear extrusion, and in particular in case of the rotary swaging, a mandrel (not shown) is inserted into a hollow portion of the large-diameter portion 120 so that the burr due to a deformation can be prevented.

A connecting portion 130 of a hollow shape may be further formed between the small-diameter portion 110 and the large-diameter portion 120 by a swaging. In particular, the connecting portion 130 may be rounded with a radius R more than 30% of the outer diameter of the small-diameter portion 110.

Meanwhile, the hollow drive shaft 100 according to an embodiment of the present invention which is formed by a rotary swaging forming or a linear extrusion forming undergoes a carburization heat treatment as follows. Hereinafter, referring again to FIG. 1 and FIG. 2, carburization heat treatment will be described in detail.

Here, the carburization is a heat treatment process in which iron absorbs carbon and is a surface hardening method of converting a surface portion of soft iron with low carbon content into martensite with high carbon content. In addition, in determining the criteria of the carburization, the large-diameter portion 120 among the small-diameter portion 110 and the large-diameter portion 120 is determined as a criteria of the carburization.

As shown in FIG. 1 and FIG. 2, the carburization heat treatment is performed on the whole of the hollow drive shaft 100. In particular, the carburization heat treatment is performed such that a first sectional portion 121 from an outer surface to a point corresponding to 35% to 60% of the sectional thickness of the large-diameter portion 120 is converted to have a hardness of more than HRC 55. It can be known from experiments that if the range is less than 35%, a desired strength cannot be obtained so that the hollow drive shaft is broken at a weak area while the drive shaft rotates, and on the other hand if the range is greater than 60%, the brittleness is increased so that the hollow drive shaft is broken relatively early. Further, it can be known from experiments that the hardness of the first sectional portion 121 is less than HRC 55, a desired strength cannot be obtained so that the hollow drive shaft is broken at a weak area. Further, although the treatment condition for obtaining the hardness of more than HRC 55 of the first sectional portion 121 may be divided into the heat treatment temperature and the heat treatment time, the temperature and the time are set differently depending on the composition ratio of the hollow drive shaft 100. For example, the heat treatment temperature may be set at about 850°C. to 880°C., and the heat treatment time may be set at about 90 minutes to 120 minutes.

A second sectional portion 122 of the large-diameter portion 120 except the first sectional portion 121 is treated by the carburization to have a hardness of about HRC 40. In particular, the reason of setting the hardness of the second sectional portion 122 as about HRC 40 is to prevent the hardness of the first sectional portion 121 from increasing boundlessly and to provide a lower criteria of the conditions of the carburization heat treatment (heat treatment temperature and time). Further, it can be known from experiments that if the range is greater than about 40%, the brittleness of the whole of the hollow drive shaft 100 is increased, and if the range is less than about 40%, the hardness of the first sectional portion 121 cannot reach at more than HRC 55.

The small-diameter portion 110 may be carburized together with the large-diameter portion 120 to be hardened in a heat treatment condition (above-described heat treatment temperature and time) in which the first sectional portion 121 of the large-diameter portion 120 is formed to have the hardness of more than HRC 55 and at the same time the second sectional portion 122 of the large-diameter portion 120 is formed to have the hardness of more than HRC 40. In particular, while the large-diameter portion 120 and the small-diameter portion 110 are being carburized under the above-mentioned heat treatment conditions, as shown in FIG. 1 and FIG. 2, a transition portion 123 having the hardness of HRC 40 to HRC 55 may be formed between the first sectional portion 121 and the second sectional portion 122.

Also, the large-diameter portion 120 and the small-diameter portion 110 may be heat-treated by a vacuum carburization. Accordingly, it is possible to prevent the integranular oxidized layer from being generated on surfaces of the large-diameter portion 120 and the small-diameter portion 110. As another example, in order to remove the integranular oxidized layer on the surfaces of the large-diameter portion 120 and the small-diameter portion 110, the surfaces of the large-diameter portion 120 and the small-diameter portion 110 may be homogenized by a shot blast.

Hereinafter, referring to FIG. 3, a method for manufacturing the hollow drive shaft 100 according to an embodiment of the present invention.

Figure 3:
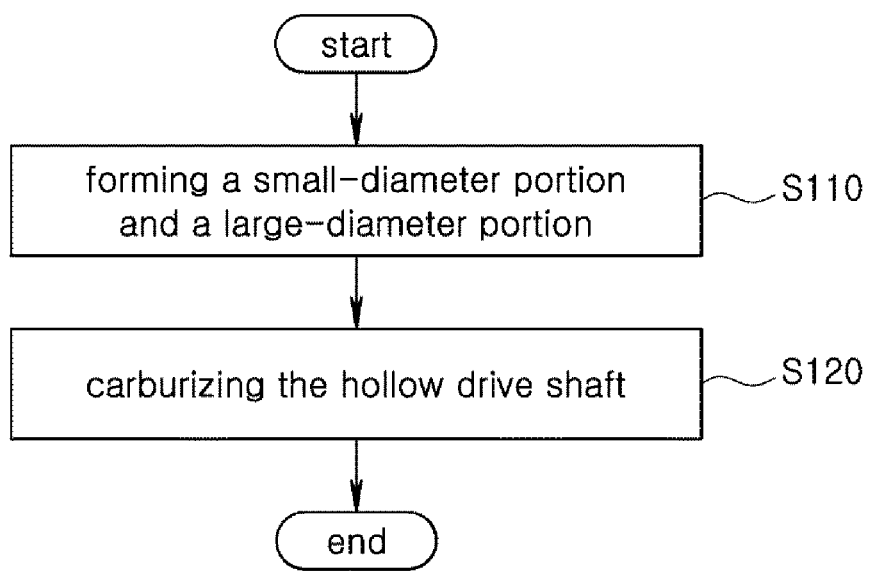
FIG. 3 is a flow chart for explaining a manufacturing method of a hollow drive shaft according to an embodiment of the present invention.

FIG. 3 is a flow chart for explaining a manufacturing method of a hollow drive shaft according to an embodiment of the present invention.

First, one or more small-diameter portion 110 of a hollow shape and a large-diameter portion 120 of a hollow shape which is disposed in the vicinity of the small-diameter portion 110 and has a relatively great outer diameter to the small-diameter portion 110 are formed, and it is formed such that the sectional thickness of the large-diameter portion 120 is less than the sectional thickness of the small-diameter portion 110 (S110). In particular, the forming may be performed by a rotary swaging or a linear extrusion. Further detailed descriptions will be omitted since these have been described in the description of the hollow drive shaft 100.

Subsequently, the small-diameter portion 110 and the large-diameter portion 120 are carburized (S120). In particular, the carburization is performed under the treatment condition in which the hardness of the first sectional portion 121 from an outer surface to a point corresponding to 35% to 60% of the sectional thickness of the large-diameter portion 120 becomes more than HRC 55.

In this heat treatment condition, the second sectional portion 122 of the large-diameter portion 120 except the first sectional portion 121 may be formed with the hardness of HRC 40. Further, in this heat treatment condition, the transition portion 123 having the hardness of between HRC 40 to HRC 55 may be formed between the first sectional portion 121 and the second sectional portion 122. In particular, the forming may be performed by a rotary swaging or a linear extrusion. Further detailed descriptions will be omitted since these have been described in the description of the hollow drive shaft 100.

As such, the hollow drive shaft according to an embodiment of the present invention and a manufacturing thereof have the following advantages.

According to an embodiment of the present invention, since the whole portion of the hollow drive shaft 100 having different sectional thicknesses and outer diameters are carburized to be hardened and the first sectional portion 121 from an outer surface to a point corresponding to 35% to 60% of the sectional thickness of the large-diameter portion 120 is carburized to have the hardness of more than HRC 55, the strength along the whole length may be uniformed so that it can be minimized that the hollow drive shaft 100 is broken at its weak point. In particular, in case that the hardness of the first section portion 121 is greater than the hardness of the second sectional portion 122, the strength along the whole length may be maximally uniformed so that it can be minimized that the hollow drive shaft 100 is broken at its weak point.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

The present invention relates to a hollow drive shaft of a vehicle and can be applied to parts of a vehicle, so it has an industrial applicability.

The invention claimed is:
1. A hollow drive shaft comprising:
one or more first-diameter portion having a hollow shape; and
a second-diameter portion which is disposed in a vicinity of the one or more first-diameter portion and has an outer diameter relatively greater than the one or more first-diameter portion,
wherein a sectional thickness of the second-diameter portion is less than a sectional thickness of the one or more first-diameter portion,
wherein a first sectional portion defined from an outer surface of the second-diameter portion to a point corresponding to 35% to 60% of the sectional thickness of the second-diameter portion is carburized to have a first hardness,
wherein a second sectional portion of the second-diameter portion except the first sectional portion is carburized to have a hardness of HRC 40, and
wherein the one or more first-diameter portion is carburized to be hardened under a heat treatment condition in which the first sectional portion is hardened more than HRC 55 and at the same time the second sectional portion is hardened HRC 40.

2. The hollow drive shaft of claim 1, further comprising a transition portion having a hardness of between HRC 40 to HRC 55 and disposed between the first sectional portion and the second sectional portion.

3. The hollow drive shaft of claim 1, wherein the second-diameter portion is heat-treated by a vacuum carburization.

4. The hollow drive shaft of claim 1, wherein a surface of the second-diameter portion is homogenized by a shot blast.

5. The hollow drive shaft of claim 1, wherein the one of more first-diameter portion comprises a front-diameter portion and a rear-diameter portion, and the second-diameter portion is disposed between the front-diameter portion and the rear-diameter portion.

6. A hollow drive shaft comprising:
   one or more first-diameter portion having a hollow shape; and
   a second-diameter portion which is disposed in a vicinity of the one or more first-diameter portion and has an outer diameter relatively greater than the one or more first-diameter portion,
   wherein a sectional thickness of the second-diameter portion is less than a sectional thickness of the one or more first-diameter portion,
   wherein a first sectional portion defined from an outer surface of the second-diameter portion to a point corresponding to 35% to 60% of the sectional thickness of the second-diameter portion is carburized to have a first hardness,
   wherein the one or more first-diameter portion and the second-diameter portion are formed by a swaging,
   wherein a connecting portion of a hollow shape is formed between the one or more first-diameter portion and the second-diameter portion by the swaging,
   wherein the connecting portion is rounded with a radius more than 30% of an outer diameter of the one or more first-diameter portion.

7. A method for manufacturing a hollow drive shaft, comprising:
   forming one or more first-diameter portion having a hollow shape and a second-diameter portion which is disposed in a vicinity of the one or more first-diameter portion and has an outer diameter relatively greater than the one or more first-diameter portion, a sectional thickness of the second-diameter portion being less than a sectional thickness of the one or more first-diameter portion; and
   carburizing the one or more first-diameter portion and the second-diameter portion,
   wherein the carburizing is performed under a heat treatment condition in which a first sectional portion defined from an outer surface of the second-diameter portion to a point corresponding to 35% to 60% of the sectional thickness of the second-diameter portion is carburized to have a hardness of more than HRC 55, and
   wherein, in the heat treatment condition, a second sectional portion of the second-diameter portion except the first sectional portion is carburized to have a hardness of HRC 40.

8. The method of claim 7, wherein, in the heat treatment condition, a transition portion having a hardness of between HRC 40 to HRC 55 is formed between the first sectional portion and the second sectional portion.

9. The method of claim 7, wherein the second-diameter portion is heat-treated by a vacuum carburization.

10. The method of claim 7, a surface of the second-diameter portion is homogenized by a shot blast.

11. The method of claim 7, wherein, in the forming, the one or more first-diameter portion and the second-diameter portion are formed by a swaging.

12. A method for manufacturing a hollow drive shaft, comprising:
   forming one or more first-diameter portion having a hollow shape and a second-diameter portion which is disposed in a vicinity of the one or more first-diameter portion and has an outer diameter relatively greater than the one or more first-diameter portion, a sectional thickness of the second-diameter portion being less than a sectional thickness of the one or more first-diameter portion; and
   carburizing the one or more first-diameter portion and the second-diameter portion,
   wherein the carburizing is performed under a heat treatment condition in which a first sectional portion defined from an outer surface of the second-diameter portion to a point corresponding to 35% to 60% of the sectional thickness of the second-diameter portion is carburized to have a hardness of more than HRC 55,
   wherein, in the forming, the one or more first-diameter portion and the second-diameter portion are formed by a swaging, and
   wherein a connecting portion of a hollow shape is formed between the one or more first-diameter portion and the second-diameter portion by the swaging, and wherein the connecting portion is rounded with a radius more than 30% of an outer diameter of the one or more first-diameter portion.

13. A hollow drive shaft comprising:
   one or more small-diameter portion having a hollow shape; and
   a second-diameter portion which is disposed in the vicinity of the one or more first-diameter portion and has an outer diameter relatively greater than the one or more first-diameter portion,
   wherein a sectional thickness of the second-diameter portion is less than a sectional thickness of the one or more first-diameter portion,
   wherein a first sectional portion from an outer surface to a point corresponding to 35% to 60% of a sectional thickness of the second-diameter portion is carburized to have a first hardness,
   wherein a second sectional portion of the second-diameter portion except the first sectional portion is carburized to have a second hardness, and
   wherein the first hardness is greater than the second hardness,
   wherein the carburizing is performed under a heat treatment condition in which a first sectional portion defined from an outer surface of the second-diameter portion to a point corresponding to 35% to 60% of the sectional thickness of the second-diameter portion is carburized to have a hardness of more than HRC 55, and
   wherein, in the heat treatment condition, a second sectional portion of the second-diameter portion except the first sectional portion is carburized to have a hardness of HRC 40.

* * * * *